A. G. GRICE.
MOTOR VEHICLE.
APPLICATION FILED JULY 1, 1918.
1,368,032.
Patented Feb. 8, 1921.
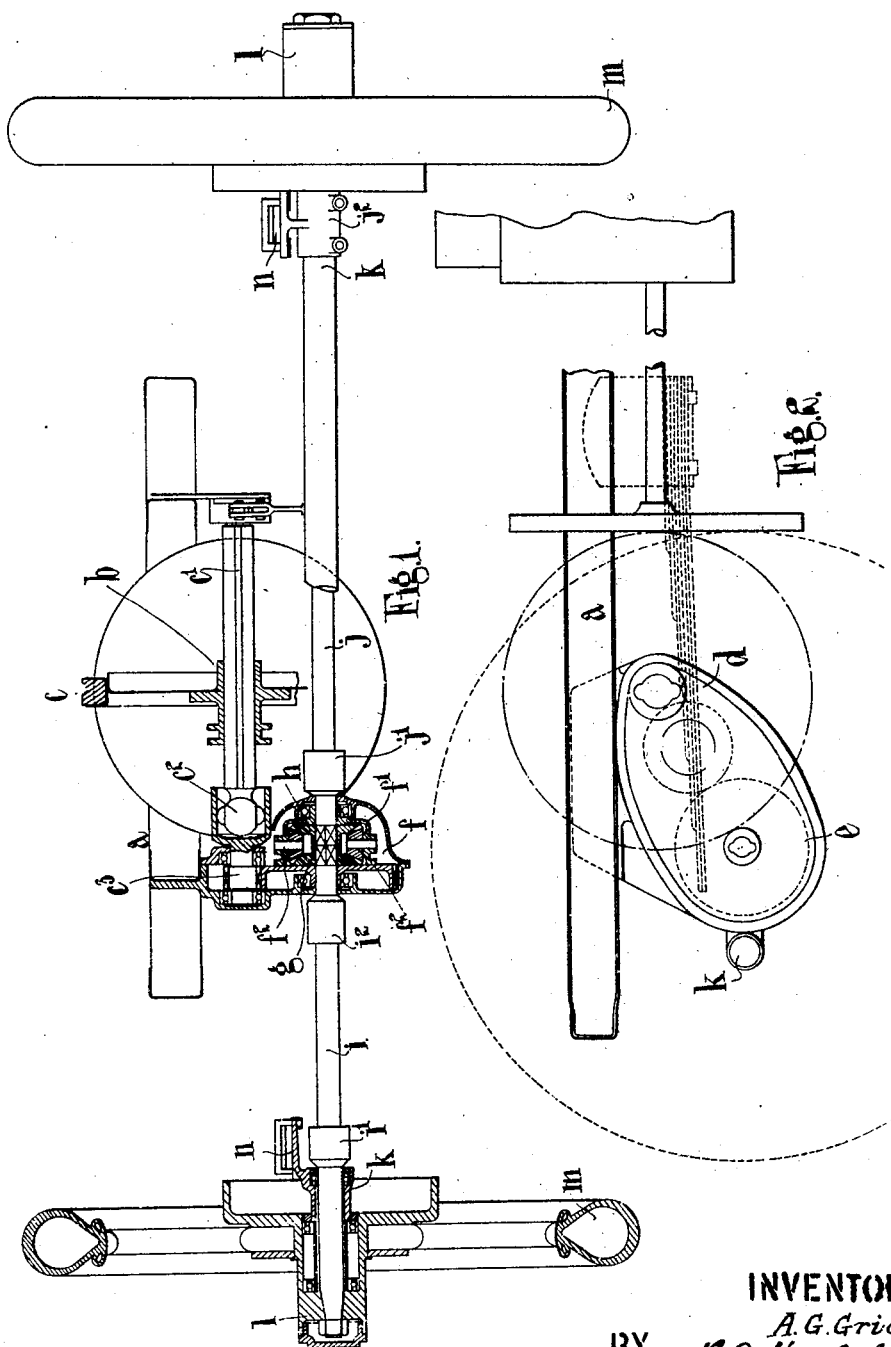
INVENTOR
A. G. Grice.
BY L. R. Kerslake
ATTORNEY

UNITED STATES PATENT OFFICE.

ARTHUR GEORGE GRICE, OF MAIDENHEAD, ENGLAND, ASSIGNOR OF ONE-HALF TO G. & V. R. LIMITED, OF MAIDENHEAD, BERKS, ENGLAND.

MOTOR-VEHICLE.

1,368,032.   Specification of Letters Patent.   Patented Feb. 8, 1921.

Application filed July 1, 1918. Serial No. 242,873.

*To all whom it may concern:*

Be it known that I, ARTHUR GEORGE GRICE, a subject of the King of Great Britain and Ireland, and residing at Cordwalles Works, Maidenhead, in the county of Berks, England, have invented certain new and useful Improvements in and Relating to Motor-Vehicles, of which the following is a specification.

This invention relates to motor vehicles provided with driving gear of the type having a driven friction element connected by speed reduction gearing to the pinion-carrying member of a differential gear, the relatively movable shaft portions of which distribute the power at or about the speed of the road wheels.

In driving gears of the above type it is a common practice to position the friction gear at the forward end of the vehicle and to transmit the drive through chains or the like to the driving wheels. In instances where the friction drive has been positioned adjacent to the rear driving axle a rigid axle has been carried from one driving wheel to another, necessitating complicated gearing in the connection of the other parts.

The object of the present invention is to provide an improved and simplified form of such driving gear.

The invention consists in a power transmission gear as indicated, in which the friction drive, speed reduction and differential gear are carried upon the chassis frame and the road wheels are mounted directly on the ends of the shaft portions of the differential, flexible connections being provided in said portions to accommodate spring mounting of the road wheels.

The invention also consists in variable speed friction power transmission gear for motor vehicles as hereinafter described.

Referring now to the accompanying drawings:—

Figure 1 is a view partly in section of the power transmission, transverse axle and road driving wheels of a motor vehicle in accordance with this invention, and Fig. 2 is a fragmentary view upon a plane at right angles to the plane of Fig. 1.

In carrying the invention into effect as shown by way of example in the accompanying drawings, a motor chassis frame $a$ is fitted with a variable speed friction transmission gear $b$ of the type described in British Patent No. 21228 of 1911.

The motor power shaft is conveniently situated in the plane of the central longitudinal axis of the vehicle and the axially movable rim friction wheel $c$ is mounted upon a short transverse shaft $c'$ carried in bearings rigidly attached to the chassis frame.

The shaft $c'$ drives through the flexible coupling $c^2$ a pinion $c^3$ which by means of the intermediate and driven gear wheels $d$ and $e$ transmits the power to the casing or frame member $f'$ carrying the intermediate pinions $f^2$ of a differential gear-box $f$ also rigidly connected to the chassis frame $a$.

The two relatively movable wheels $g$ and $h$ of the differential gear are mounted upon shaft portions $i$ and $j$ provided with flexible connections $i'$ $i^2$ and $j'$ $j^2$, said shafts passing through the ends of the hollow axle member $k$ and being connected to the hubs $l$ of the road driving wheels $m$. The hollow axle member $k$ is cranked back, as shown in Fig. 2, and passes transversely across the vehicle, being flexibly connected to the chassis body by means of the springs $n$.

Having now described my invention, what I claim as new and desire to secure by Letters Patent is:—

1. A variable speed power transmission gear of the type indicated comprising in combination and in the following sequence a variable speed gear of the disk and wheel type connected by a speed reduction gear with the intermediate pinion carrying element of the differential gear-box and all rigidly carried by the chassis frame, Cardan shafts connecting the two relatively movable wheels of the differential with the corresponding axle members upon which are mounted the road driving wheels flexibly connected to the said frame.

2. A variable speed power transmission gear of the type indicated comprising in combination and in the following sequence a face friction disk driving a coöperating axially movable rim friction wheel connected by a speed reduction gear with the intermediate pinion carrying element of the differential gear-box and all rigidly carried by the chassis frame, Cardan shafts connecting the two relatively movable wheels of the differential with the corresponding axle members upon which are mounted the road driving wheels flexibly connected to the said frame.

In testimony whereof I have signed my name to this specification.

ARTHUR GEORGE GRICE.